US008194236B2

(12) United States Patent
Fujimoto et al.

(10) Patent No.: US 8,194,236 B2
(45) Date of Patent: Jun. 5, 2012

(54) SHEET IDENTIFYING DEVICE

(75) Inventors: Jun Fujimoto, Koto-ku (JP); Nobuyuki Nonaka, Koto-ku (JP); Takao Nireki, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 520 days.

(21) Appl. No.: 12/441,542

(22) PCT Filed: Jul. 31, 2007

(86) PCT No.: PCT/JP2007/065019
§ 371 (c)(1),
(2), (4) Date: Mar. 17, 2009

(87) PCT Pub. No.: WO2008/041411
PCT Pub. Date: Apr. 10, 2008

(65) Prior Publication Data

US 2010/0026990 A1 Feb. 4, 2010

(30) Foreign Application Priority Data

Sep. 29, 2006 (JP) ................................ 2006-266779

(51) Int. Cl.
*G06K 9/74* (2006.01)
*G06K 9/00* (2006.01)

(52) U.S. Cl. ......................................... 356/71; 382/135

(58) Field of Classification Search .................... 356/71; 382/135, 136, 137, 138
See application file for complete search history.

(56) References Cited

U.S. PATENT DOCUMENTS

| | | | | |
|---|---|---|---|---|
| 6,040,584 | A | 3/2000 | Liu et al. | |
| 6,142,285 | A * | 11/2000 | Panzeri et al. | 194/328 |
| 6,354,507 | B1 | 3/2002 | Maeda et al. | |
| 7,097,022 | B2 * | 8/2006 | Mukai | 194/207 |
| 7,584,890 | B2 * | 9/2009 | Mazowiesky et al. | 235/454 |
| 7,757,951 | B2 * | 7/2010 | Mazowiesky | 235/440 |
| 7,804,982 | B2 * | 9/2010 | Howard et al. | 382/115 |
| 2002/0044673 | A1 | 4/2002 | Powell et al. | |
| 2004/0076310 | A1 * | 4/2004 | Hersch et al. | 382/100 |
| 2005/0133339 | A1 * | 6/2005 | Mukai | 194/207 |
| 2007/0097414 | A1 * | 5/2007 | Harada | 358/1.14 |
| 2007/0295812 | A1 * | 12/2007 | Mazowiesky et al. | 235/454 |
| 2011/0019872 | A1 * | 1/2011 | Manabe | 382/100 |
| 2011/0089236 | A1 * | 4/2011 | Chung et al. | 235/386 |

FOREIGN PATENT DOCUMENTS

| | | | |
|---|---|---|---|
| EP | 0 472 192 | A2 | 2/1992 |
| EP | 1 056 057 | A1 | 11/2000 |
| EP | 1 471 472 | A2 | 10/2004 |

(Continued)

*Primary Examiner* — Roy M Punnoose
(74) *Attorney, Agent, or Firm* — Edwards Wildman Palmer LLP

(57) ABSTRACT

A sheet identifying device includes a reader for reading a sheet in a plurality of pixels, a respective one of which includes color information having a brightness, a predetermined size of which is defined as one unit. The sheet identifying device also includes a storage section for storing image data made up of the plurality of pixels read by the reader. Further, the sheet identifying device includes an increasing/decreasing section that increases/decreases a number of pixels in the image data. In addition, the sheet identifying device includes a sheet identifying section that identifies an authentication of the sheet, based upon the image data having the number of pixels increased/decreased by the increasing/decreasing section. The sheet identifying device further includes a variable wavelength light-emitting section which is capable of irradiating a print area of the sheet with light beams having different wavelengths.

1 Claim, 13 Drawing Sheets

FOREIGN PATENT DOCUMENTS

| | | | |
|---|---|---|---|
| GB | 2 366 371 | A | 3/2002 |
| JP | 7 306964 | | 11/1995 |
| JP | 11 110545 | | 4/1999 |
| JP | 2001 101473 | | 4/2001 |
| JP | 2004 78620 | | 3/2004 |
| WO | WO 02/50790 | A1 | 6/2002 |

* cited by examiner

SHEET IDENTIFYING DEVICE

TECHNICAL FIELD

The present invention relates to a sheet identifying device for identifying validity of sheets having an exchange value (economic value) with a variety of commodities or services such as bills, coupon tickets, and gift tickets, for example.

BACKGROUND ART

In general, in order to prevent counterfeit, a variety of anti-counterfeit measures are taken for sheets such as bills, coupon tickets, gift tickets. For example, as one of the above-mentioned counterfeit measures, micro-printing (of extremely fine characters or patterns) is applied, information of this micro-printing is read, and the read information is compared with valid data, thereby identifying validity thereof (judging authentication). In other words, in the above micro-printing, it is known that specific patterns (moire fringes; moire patterns) are present owing to optical interference because a line width is extremely fine, and further, the moire fringes (moire patterns) are acquired, and the acquired fringes are compared with valid data, thereby identifying validity of sheets.

For example, Japanese Laid-open Patent Application No. 2004-78620 discloses a technique of forming a hidden pattern made up of lines on an information recording object as a sheet, irradiating this hidden pattern with a light source, and sensing reflection light thereof by means of an optical sensor via a check pattern (with a check line pattern formed). In this case, in the optical sensor, lines of the hidden patterns and those of check patterns interfere with one another, thereby making it possible to sense a specific moire pattern, and further, the sensed pattern is compared with a standard moire pattern, thereby judging authentication.

Further, like Japanese Laid-open Patent Application No. 2004-78620 mentioned previously, Japanese Laid-open Patent Application No. 7-306964 discloses a technique of irradiating a sheet having a microprint with light by means of a strobe lighting system, and sensing reflection light thereof by means of an image detector (area sensor) via a moire fringe generator (lattice plate). Specifically, the reflection light from the microprint passes through the lattice plate mentioned above whereby moire fringes may occur. Therefore, after the moire fringes have been sensed by means of the area sensor that is an image detector, if the intensity of a periodic component "fm" thereof exceeds a preset threshold "Th", it is determined to be affirmative, or alternatively, if the periodic component "fm" fails to exceed the threshold value "Th", it is determined to be negative.

In the sheet identifying device having an authentication judgment technique mentioned above, a sensor with a resolution higher than that of a conventionally used sensor may be employed in order to enhance precision of judging authentication. In such a case, in the technique disclosed in the publicly known document mentioned above, a filter (lattice plate) having a check pattern is rechecked so that a moire pattern is generated and the filter (lattice plate) according to the recheck needs to be remanufactured, thus making it difficult to restrain higher cost.

Further, in the sheet identifying device for judging authentication of sheets mentioned above, a light emitting element irradiating infrared rays (light emitting element irradiating light with wavelength of infrared-ray bandwidth) is installed in a sheet transfer path, irrespective of a microprint (moire pattern); the sheets to be fed is irradiated with infrared rays; reflection light or transmission light thereof is sensed; and the sensed light is compared with sheet data, thereby occasionally judging authentication. This is a system of judging authentication utilizing wavelength absorption characteristics specific to the print ink applied to sheets.

Incidentally, if bills are exemplified as sheets, under the present circumstances, the bills are prepared with the use of a variety of print inks in countries, thus making it difficult to judge authentication of all of the bills with only one wavelength by means of one identifying device. In other words, a dedicated bill identifying device for each type of bill (for each country's currency) needs to be provided, resulting in higher cost of the bill identifying device. In the future, there may be a case in which a new amount of bill is introduced or a print design is changed, and in the current bill identifying device, there may arise a possibility that precise identification cannot be effected in the future. Thus, a dedicated identifying device needs to be newly manufactured, similarly resulting in higher cost.

The present invention has been made in view of the above-described problem, and aims to provide a sheet identifying device which restrains higher cost and enables judgment of authentication utilizing a microprint formed on a sheet.

Further, the present invention aims to provide a sheet identifying device, which restrains higher cost and enables judgment of authentication, even if a type of sheet to be identified is varied.

DISCLOSURE OF THE INVENTION

One aspect of a sheet identifying device according to the present invention is characterized by including: a reader for reading a sheet in pixels, a respective one of which includes color information having brightness, a predetermined size of which is defined as one unit; a storage section for storing image data made up of the plurality of pixels read by means of the reader; an increasing/decreasing section for increasing/decreasing a number of pixels in the image data; and a sheet identifying section for identifying authentication of the sheet, based upon the image data increased/decreased by means of the increasing/decreasing section.

According to the above-structured sheet identifying device, the number of pixels of image data pertinent to an acquired sheet is increased/decreased, thereby making it possible to acquire moire data expressed with streak-like patterns (moire fringes) specific to the sheet. In this manner, for example, in order to enhance precision of identification, even in a case where a sensor constituting a sheet reader is changed to the one having high resolution, a filter for generating moire fringes needs to be newly manufactured, thus making it possible to restrain higher cost.

The above-structured sheet identifying device may be characterized in that the number of pixels is increased/decreased by means of the increasing/decreasing section at a ratio which is different from another one in a sheet acquisition direction and in a direction orthogonal thereto.

According to the above-structured device, moire fringes are likely to occur with image data, making it possible to easily acquire moire data, merely by increasing/decreasing the number of pixels of image data pertinent to the acquired sheet at a different ratio in the sheet acquisition direction and in a direction orthogonal thereto.

The above-structured sheet identifying device may be characterized by including a parameter setting section for setting an increasing/decreasing ratio so that increasing/decreasing the number of pixels by means of the increasing/ decreasing section is executed at a predetermined increasing/decreasing ratio in the sheet acquisition direction and in the direction orthogonal thereto.

According to the above-structured device, it becomes possible to acquire optimal moire data responsive to resolution of a sensor, merely by varying a parameter (such as 50% in vertical direction and 50% in horizontal direction). Thus, it is sufficient if a parameter for expanding/reducing image data is allocated in a storage area, and an unwanted storage area does not need to be allocated, thus making it possible to restrain higher cost.

The above-structured sheet identifying device may be characterized by including a variable wavelength light-emitting section which is capable of irradiating a print area of the sheet with light beams having different wavelengths.

According to the above-structured device, it becomes possible to judge authentication of a sheet different from another one, by one device, because a print area of the sheet can be irradiated with light beams having different wavelengths. In other words, depending upon the type of ink, the print ink employed in the sheet print area has property of absorbing or reflecting (one or more) specific wavelength light (beams), thus making it possible to select wavelength light optimal for the print ink employed for a sheet to be judged for authentication. Therefore, a dedicated identifying device does not need to be provided on a sheet-by-sheet basis, making it possible to implement precise identification even if a different sheet is employed.

Another aspect of a sheet identifying device according to the present invention is characterized by including: a variable wavelength light-emitting section which irradiate a print area of a sheet with light beams having different wavelengths; a sensor for sensing at least one of transmission light and reflection light obtained from the sheet with respect to light emitted from the variable wavelength light-emitting section; a storage section for storing reference sheet data of the sheet obtained from light having a wavelength, in response to the wavelength of the light with which the sheet is irradiated; and an authentication judging section for comparing the sheet data sensed by means of the sensor with the reference sheet data based upon the wavelength of the irradiated light, and thereafter, judging authentication of the sheet.

In the above-structured sheet identifying device, a print area of a sheet can be irradiated with light beams having different wavelengths, thus making it possible to judge authentication of sheets of different types, by one device. In other words, depending upon the type of ink, print ink employed in the sheet print area has property of absorbing or reflecting (one or more) specific wavelength light (beams), thus making it possible to select wavelength light optimal for the print ink employed for a sheet to be judged for authentication. Therefore, a dedicated identifying device does not need to be provided on a sheet-by-sheet basis, making it possible to implement precise identification even if sheets of different types are employed.

The above-structured sheet identifying device may be characterized in that the variable wavelength light-emitting section is capable of irradiating a sheet with light having any wavelength in a range from a ultraviolet-ray zone to an infra-red-ray zone.

In other words, in the print ink employed in a sheet judged for authentication, depending upon a composition of the ink, in general, absorption property or reflection property reaches a peak at any wavelength within the range from the ultraviolet-ray bandwidth to the infrared-ray bandwidth. Thus, if the wavelength of the light-emitting section can be varied in the above bandwidth, the above print ink can be applied to most of the sheets employed.

The above-structured sheet identifying device may be characterized in that the variable wavelength light-emitting section is capable of irradiating a sheet targeted to be transferred, with light beams having different wavelengths while the sheet is transferred.

With respect to light with which a sheet is irradiated, it is also possible to select a specific wavelength from the range of variable wavelength bandwidths, and continuously irradiate the sheet to be transferred, with light having the selected wavelength. As described above, however, by varying the wavelength while the sheet is transferred, for example, optimal sheet reading information can be acquired in a case where a different print ink is employed along the reading direction. This makes it possible to enhance precision of sheet identification more remarkably.

The above-structured sheet identifying device may be characterized in that the variable wavelength light-emitting section is disposed along a transfer direction of the sheet and is capable of irradiating the sheet with linear light.

In the above-structured device, a line sensor (image sensor) is disposed as a sensing unit, thereby making it possible to acquire image information (sheet reading information) in a two-dimensional manner and to enhance precision of sheet identification more remarkably.

The above-structured sheet identifying device may be characterized in that the variable wavelength light-emitting section has a surface light emitting element.

In such surface light emitting element, non-uniformity in irradiation (difference in luminescence) between the light emitting elements is more unlikely to occur in comparison with a case in which the variable wavelength light emitting unit is a single aggregate of light emitting elements. This makes it possible to enhance precision of sheet identification more remarkably.

The above-structured sheet identifying device may be characterized in that the storage section is capable of rewriting reference sheet data of the sheet.

Reference sheet data of the sheet stored in the storage section is thus rewritten, thereby making it possible to apply even one sheet identifying device to a process of judging authentication of plural types of sheets.

BEST MODE FOR CARRYING OUT THE INVENTION

Figure 1:
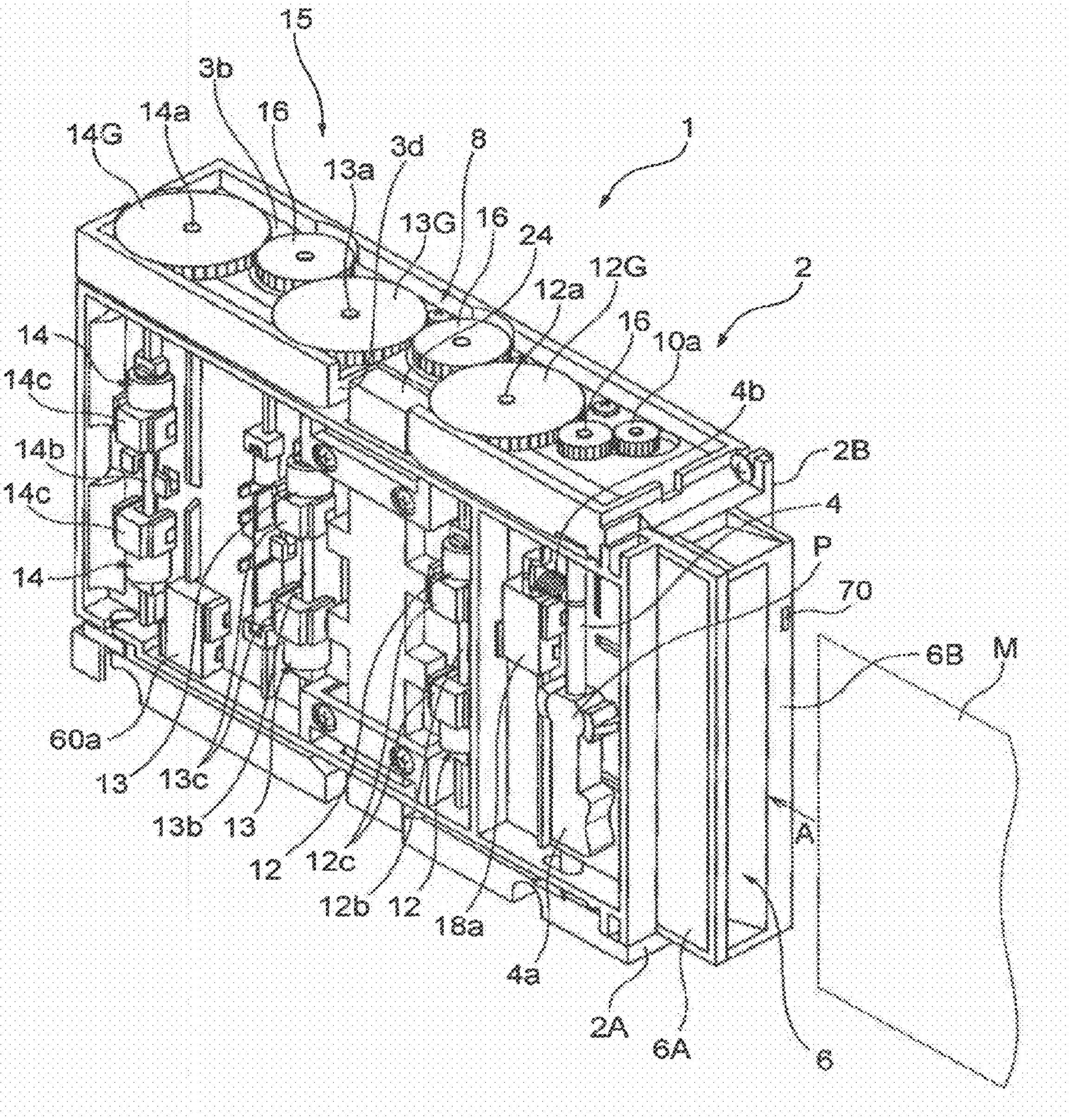
FIG. 1 is a perspective view showing an entire structure of a first embodiment of a bill identifying device according to the present invention.

Hereinafter, a first embodiment of the present invention will be described, referring to the drawings. The embodiment describes a case in which bills are subjected to a process of judging authentication and describes a case in which a device for handling the bills (sheet identifying device) is employed as a bill identifying device.

Figure 2:
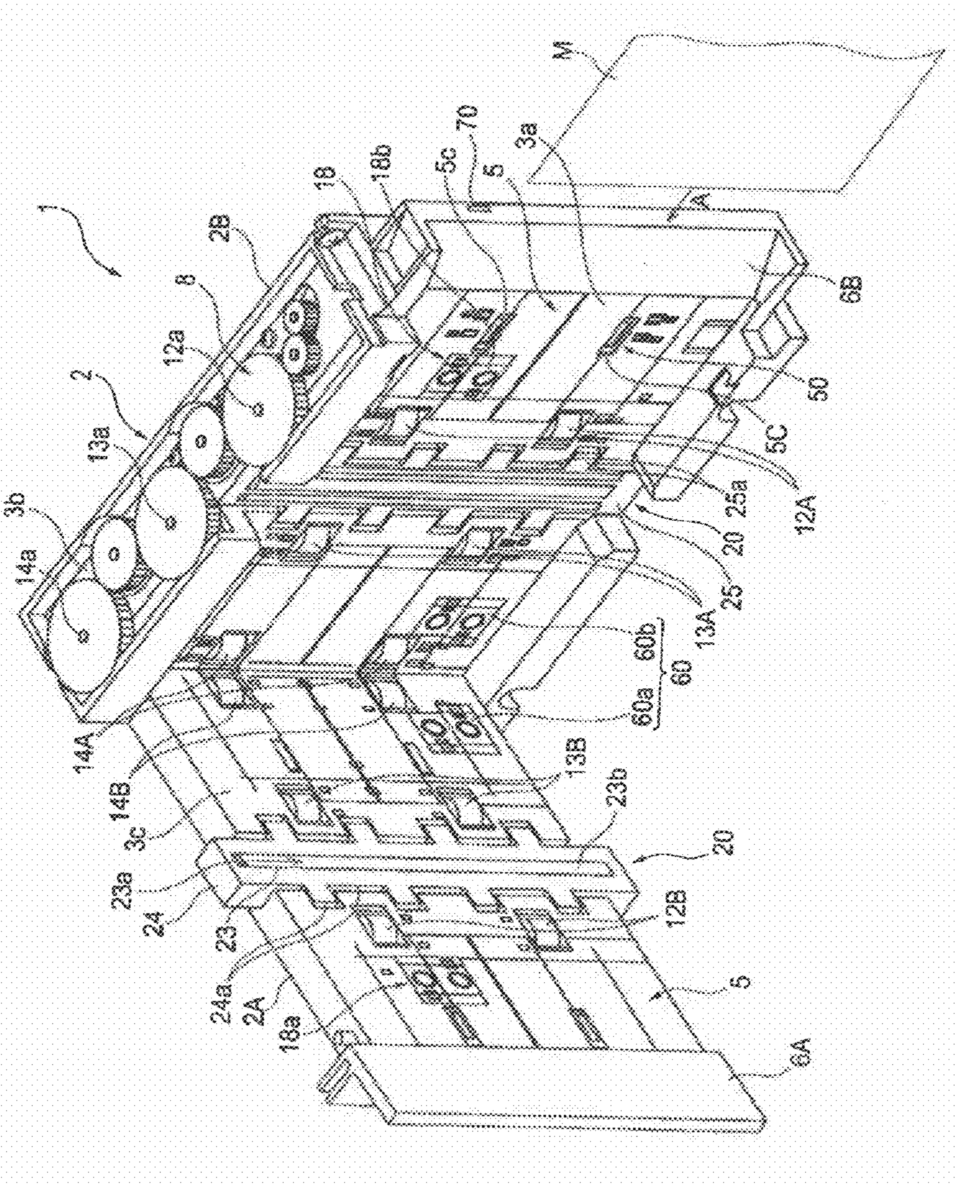
FIG. 2 is a perspective view showing a state in which an upper flame is opened relative to a lower frame.
Figure 3:
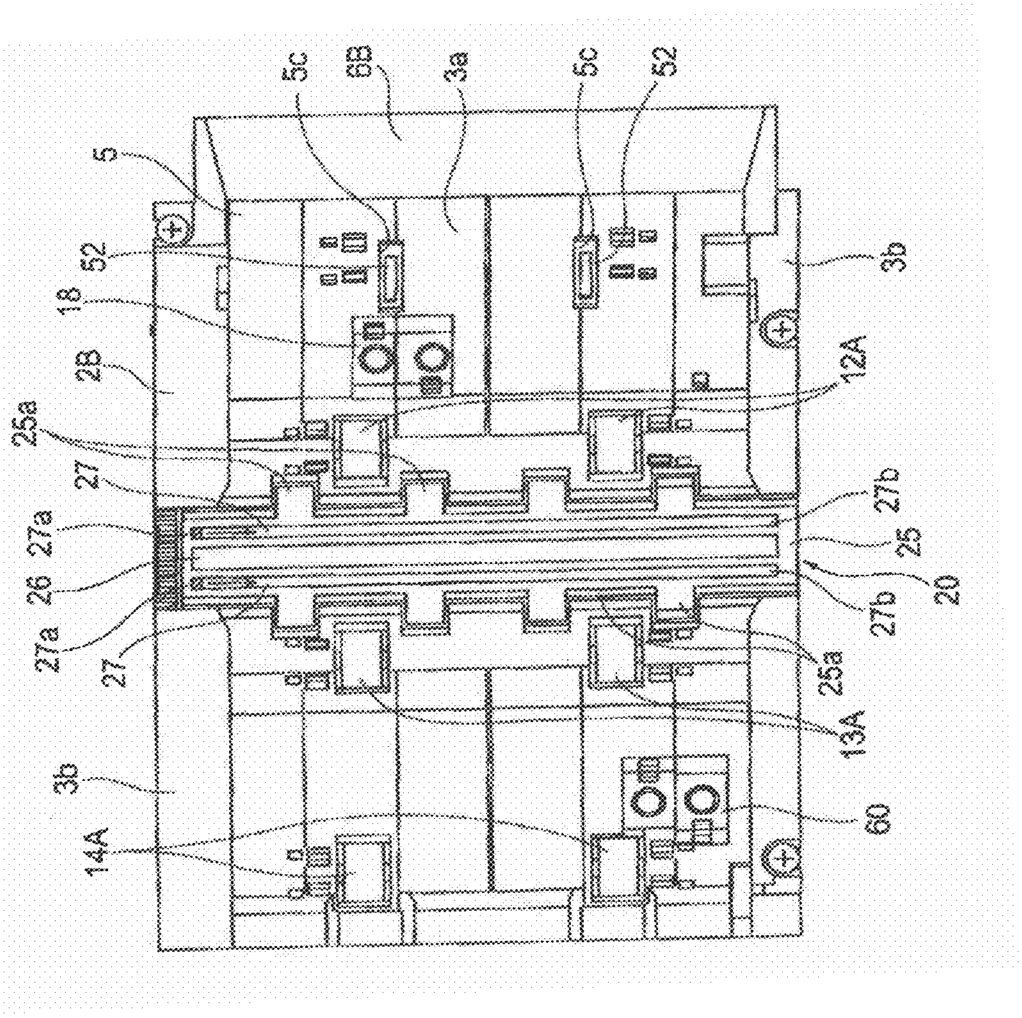
FIG. 3 is a plan view showing a bill transfer path portion of the lower frame.
Figure 4:
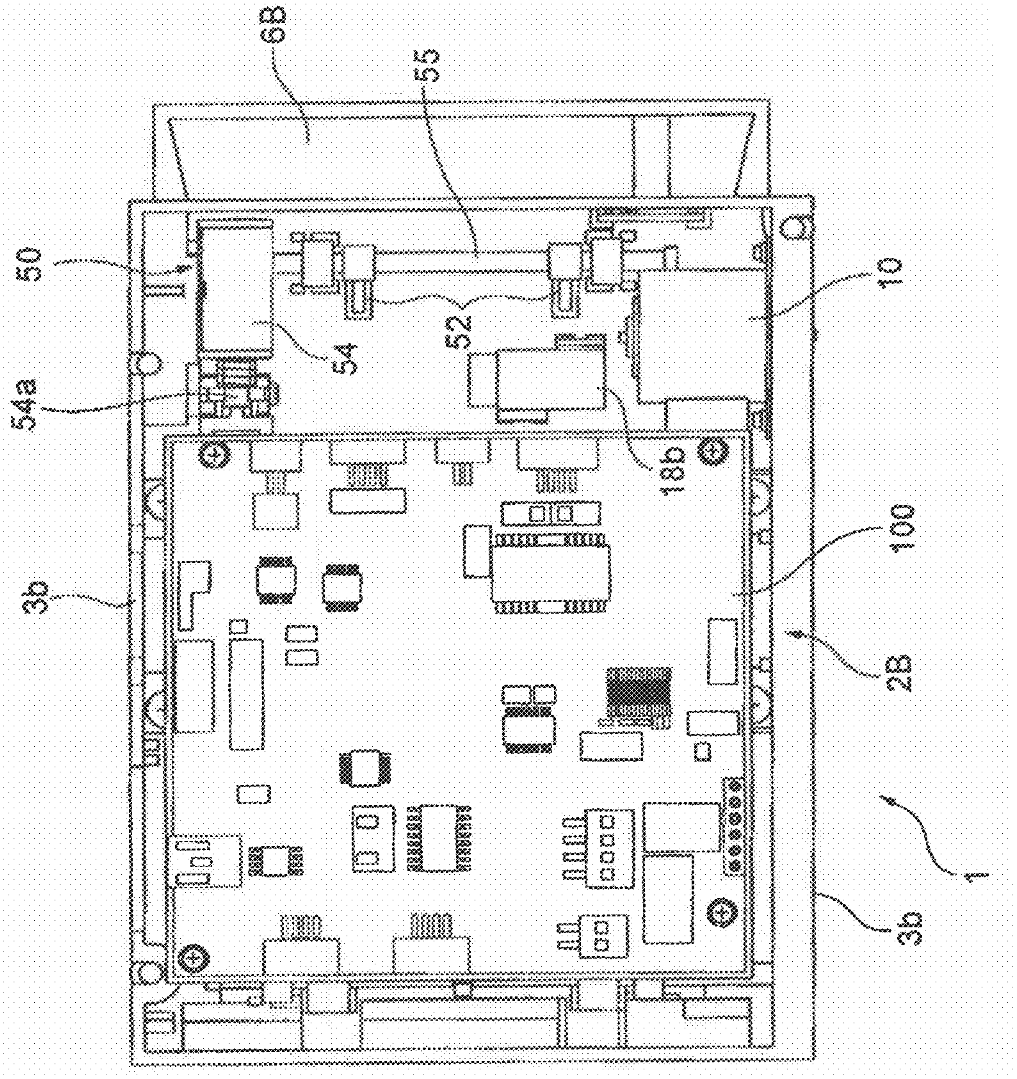
FIG. 4 is a back view of the lower frame.

FIGS. 1 to 4 are views, each of which shows a structure of a bill identifying device (sheet identifying device). FIG. 1 is a perspective view showing an entire structure of the device; FIG. 2 is a perspective view showing a state in which an upper frame is opened relative to a lower frame; FIG. 3 is a plan view showing a bill transfer path portion of the lower frame; and FIG. 4 is a back view of the lower frame.

A bill identifying device 1 of the embodiment is structured so that the device can be assembled in a gaming medium lending device (not shown) installed among a variety of gaming machines such as slot machines. In this case, in the gaming medium lending device, other equipment (such as a bill storage unit, a coin identifying device, a recording medium processor, or a power unit) may be installed at the upper or lower side of the bill identifying device 1, and the bill identifying device 1 may be integrated with these devices or may be structured alone. After a bill has been inserted into such bill identifying device 1, when validity of the inserted bill is judged, a process of lending a gaming medium according to a value of the bill or a process for writing into a recording medium such as a prepaid card is performed.

The bill identifying device 1 is provided with a frame 2 formed in the shape of a substantially rectangular parallelepiped, and this frame 2 is attached to an engagingly locking portion of the gaming medium lending device (not shown). The frame 2 has: a lower frame 2B serving as a base side; and an upper frame 2A which is openable relative to the lower frame 2B to cover it; and these frames 2A and 2B are structured to be turnably opened and closed around a base portion, as shown in FIG. 2.

The lower frame 2B is formed in the shape of a substantially rectangular parallelepiped, and includes: a bill transfer face 3*a* to which a bill is to be fed; and side walls 3*b* formed at both sides of the bill transfer face 3*a*. Further, the upper frame 2A is structured in a plate-like shape having a bill transfer face 3*c*. When the upper frame 2A is closed so as to be interposed between the side walls 3*b* at both sides of the lower frame 2B, a gap 5 between which a bill is to be fed (bill transfer path) is formed at an opposite portion between the bill transfer face 3*a* and the bill transfer face 3*c*.

At the upper and lower frames 2A and 2B, bill insertion portions 6A and 6B are formed, respectively, so as to be coincident with this bill transfer path 5. These bill insertion portions 6A and 6B form a slit-like bill insertion slot 6 when the upper and lower frames 2A and 2B are closed. A bill M is internally inserted along the direction indicated by the arrow A from a short side of the bill, as shown in FIG. 1.

A lock shaft 4, which is engagingly locked with the lower frame 2B, is disposed at a tip end side of the upper frame 2A. An operating portion 4*a* is provided at this lock shaft 4. The operating portion 4*a* is turned against a biasing force of a biasing spring 4*b*, whereby the lock shaft 4 turns around a turning fulcrum P, and a locked state of the upper and lower frames 2A and 2B (a state in which these two frames are closed; an overlapped state) is released.

At the lower frame 2B, there are provided: a bill transfer mechanism 8; a bill sensor 18 for sensing a bill inserted into a bill insertion slot 6; a bill reader 20 which is installed at the downstream side of the bill sensor 18 and reads information of a bill to be transferred; a shutter mechanism 50 which is installed in a bill transfer path 5 between the bill insertion slot 6 and the bill sensor 18 and is driven so as to close the bill insertion slot 6; and a controller (control board 100) for controlling driving of a constituent element such as the bill transfer mechanism 8, the bill reader 20, or the shutter mechanism 50, and identifying validity of the read bill (judging authentication).

The bill transfer mechanism 8 is capable of transferring the bill inserted through the bill insertion slot 6 along the insertion direction A and transferring the inserted bill back to the bill insertion slot 6. The bill transfer mechanism 8 is provided with: a drive motor 10 which is a drive source installed at the side of the lower frame 2B; and transfer roller pairs 12, 13, 14 which are arranged in the bill transfer path 5 at predetermined intervals along the bill transfer direction.

The transfer roller pair 12 has a drive roller 12A which is arranged at the side of the lower frame 2B and a pinch roller 12B which is arranged at the side of the upper frame 2A and is abutted against the drive roller 12A. These drive roller 12A and pinch roller 12B are installed on a two-by-two basis at predetermined intervals along the direction orthogonal to the bill transfer direction. These drive rollers 12A and pinch rollers 12B are partially exposed to the bill transfer path 5.

The drive rollers 12A installed at two sites are fixed to a drive shaft 12*a* rotatably supported by the lower frame 2B, and the two pinch rollers 12B are rotatably supported by a support shaft 12*b* supported by the upper frame 2A. In this case, a biasing member 12*c* for biasing the support shaft 12*b* against the drive shaft 12*a* is provided at the upper frame 2A, and the pinch rollers 12B are abutted against the drive rollers 12A at a predetermined pressure.

Like the roller pair 12, the abovementioned transfer rollers 13, 14 are also made up of: two drive rollers 13A, 14A which are fixed to drive shafts 13*a*, 14*a*, respectively; and two pinch rollers 13B, 14B which are rotatably supported by support shafts 13*b*, 14*b*. Further, the pinch rollers 13B, 14B are abutted against the drive rollers 13A, 14A at a predetermined pressure by means of biasing members 13*c*, 14*c*, respectively.

The aforementioned transfer roller pairs 12, 13, 14 are synchronously driven by means of a drive force transmission mechanism 15 which is coupled to the drive motor 10. This drive force transmission mechanism 15 is made up of a gear train rotatably arranged at one side wall 3*b* of the lower frame 2B. Specifically, the above transmission mechanism is made up of a gear train including: an output gear 10*a* which is fixed to an output shaft of the drive motor 10; input gears 12G, 13G, 14G, each of which is sequentially mated with the output gear 10*a*, and is mounted on an end of each of the drive shafts 12*a*, 13*a*, 14*a*; and an idle gear 16 which is installed between these gears.

With the abovementioned structure, when the drive motor 10 is forwardly driven, the transfer rollers pairs 12, 13, 14 are driven so as to transfer a bill in the insertion direction A, or when the drive motor 10 is reversely driven, the transfer roller pairs 12, 13, 14 are reversely driven so as to return a bill to the bill insertion slot.

Figure 5:
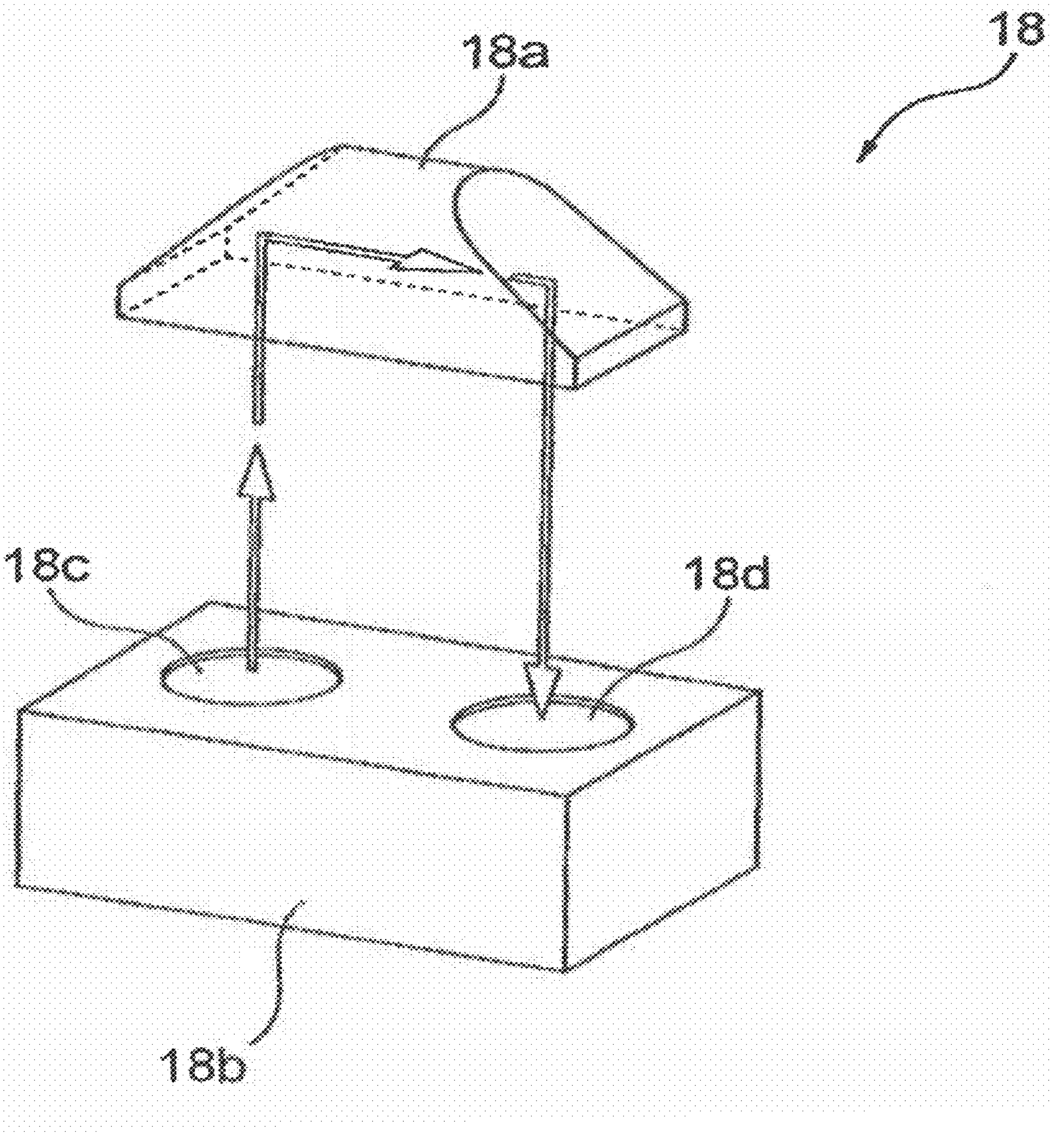
FIG. 5 is a perspective view showing a structure of a bill sensor.
Figure 6:
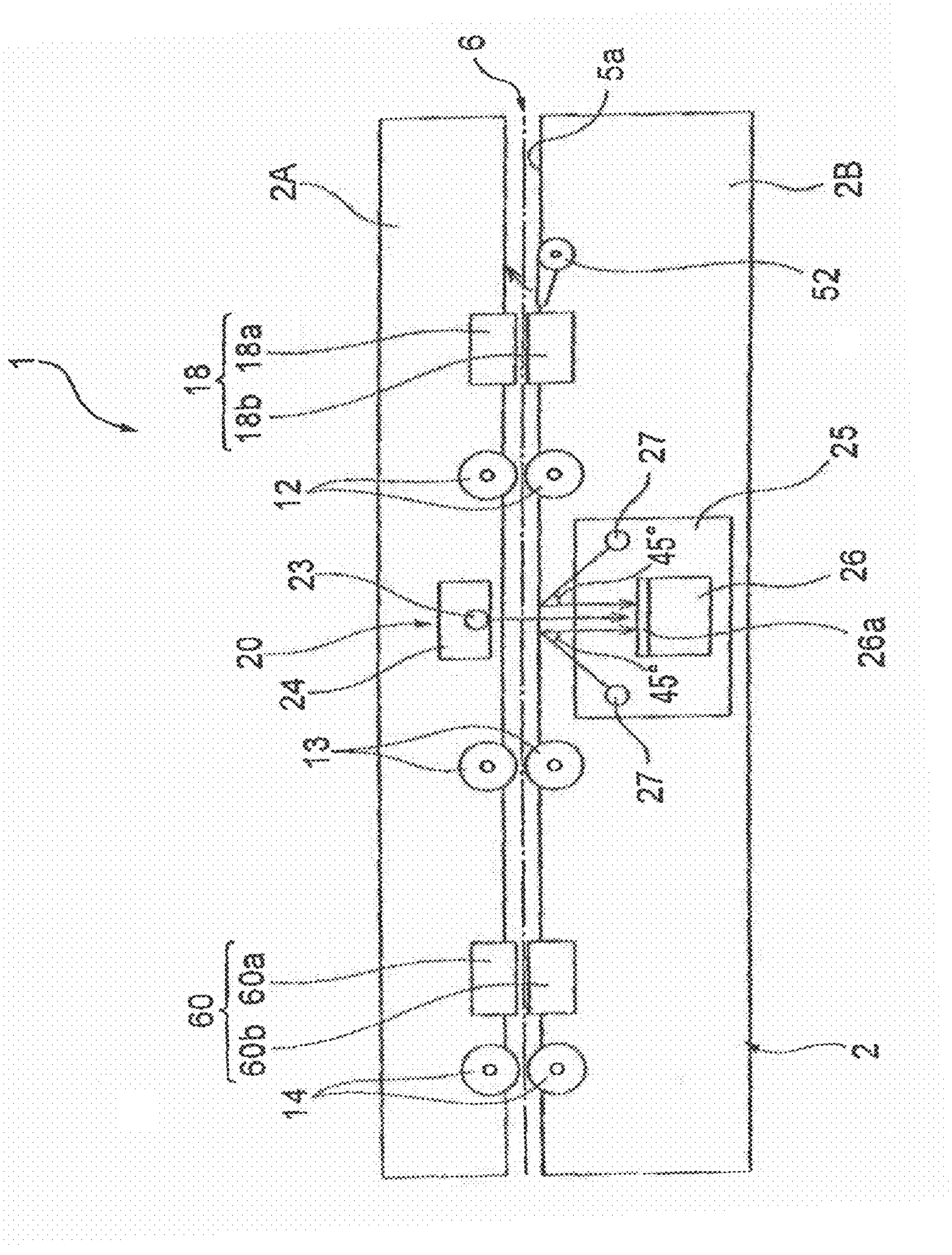
FIG. 6 is a view schematically showing a structure of a bill identifying device.

The bill sensor 18 generates a sense signal at the time of sensing a bill which is inserted into the bill insertion slot 6, and is installed between a turning piece constituting a shutter mechanism to be described later and a bill reader 20 for reading a bill. The bill sensor 18 is made up of an optical sensor, in more detail, a regression reflection type photosensor, and is made up of a prism 18*a* which is installed at the side of the upper frame 2A and a sensor main body which is installed at the side of the lower frame 2B, as shown in FIG. 5. Specifically, the prism 18*a* and the sensor main body 18*b* are laid out such that light irradiated from a light-emitting section 18*c* of the sensor main body 18*b* is sensed at a light-receiving section 18*d* of the sensor main body 10*b* via the prism 18*a*. After the bill has passed through the bill transfer path 5 which is positioned between the prism 18*a* and the sensor main body 18*b*, a sense signal is generated if the light-receiving section 18*d* fails to sense light.

The abovementioned bill sensor 18 may be made up of a mechanical sensor other than the optical sensor.

A bill reader 20 for reading information of a bill being transferred is installed at the downstream side of the bill sensor 18. The bill reader 20 may be structured which is capable of, when a bill is transferred by means of the abovementioned bill transfer mechanism 8, irradiating the bill with light, and generating a signal allowed to judge validity (authentication) of the bill. In the embodiment, both sides of the bill are irradiated with light, and transmission light and reflection light thereof are sensed by means of a light-receiving element such as a photodiode, thereby reading the bill.

In this case, among the transmission light and reflection light derived from the bill, as to the reflection light, a line sensor having the light-receiving section executes reading on a pixel-by-pixel basis on which a predetermined size is defined as one unit. Image data of the bill made up of a plurality of the thus read pixels is stored in a storage unit. The thus stored image data is subjected to image processing so that the number of pixels is increased and/or decreased at an image processing section. Image processing is effected so as to increase and/or decrease the number of pixels. A process of judging authentication in comparison with image data of a prestored authentic ticket is executed as to the image of which the number of pixels is increased and/or decreased.

For the bill-transmission light, a process of judging authentication may be performed by means of a technique similar to use of reflection light, or alternatively, may be performed with the use of any other technique.

A shutter mechanism 50 for closing the bill insertion slot 6 is arranged at the downstream side of the bill insertion slot 6. This shutter mechanism 50 has a structure that the bill insertion slot 6 is always opened, and is closed when a bill is inserted and the bill sensor 18 senses a rear end of the bill (when the bill sensor 18 is OFF) so as to preclude act of dishonesty or the like.

Specifically, the shutter 50 has: a turning piece 52 turnably driven so as to appear or disappear at predetermined intervals in the direction orthogonal to the bill transfer direction of the bill transfer path 5; and a solenoid (pull-type) 54 which is a drive source for turnably driving this turning piece 52. Two turning pieces 52 are installed widthwise of a support shaft 55, and further, on a bill transfer face 3*a* of the lower frame 2B forming the bill transfer path 5, an elongated slit 5*c* extending in the bill transfer direction is formed so that each of the turning pieces 52 can appear or disappear.

A bill passing sensor 60 for sensing passing of a bill is provided at the downstream side of the bill reader 20. In this bill passing sensor 60, a bill judged to be valid is further transferred to the downstream side, and a sense signal is generated immediately after a rear end of the bill has been sensed. Based upon generation of this sense signal, the abovementioned solenoid 54 is powered OFF (solenoid OFF), and a drive shaft 54*a* is moved in a protrusive direction by means of the biasing force of the biasing spring provided at the drive shaft 54*a*. In this manner, the turning piece 52 constituting the shutter mechanism is turnably driven so as to open a bill transfer path via the support shaft 55 coupled with the drive shaft 54*a*.

Like the abovementioned bill sensor 18, the bill passing sensor 60 is made up of an optical sensor (regression reflection-type photosensor), and is made up of a prism 60*a* which is installed at the side of the upper frame 2A and a sensor main body 60*b* which is installed at the side of the lower frame 2B. Of course, the abovementioned bill passing sensor 60 may be made up of a mechanical sensor other than the optical sensor.

An annunciation element for visually annunciating a bill-inserted state is provided in proximity to the bill insertion slot 6. Such annunciation element can be made up of a blinking LED 70, is lit by a user inserting a bill into the bill insertion slot 6, and thereafter, notifies to the user that the bill is processed, thus making it possible to prevent the user from mistakenly inserting an additional bill.

Next, a structure of the bill reader 20 that is installed at a respective one of the upper and lower frames 2A and 2B will be described, referring to FIGS. 2 to 4 and 6.

The bill reader 20 has a light emitting unit 24 and a line sensor 25. The light emitting unit 24 is arranged at the side of the upper frame 2A, and is provided with a first light-emitting section 23. This unit is also capable of irradiating slit-like light over a widthwise direction of a transfer path at the upper side of a bill to be transferred. The line sensor 25 is arranged at the side of the lower frame 2B.

The line sensor 25 that is installed at the side of the lower frame 2B has a light-receiving section 26 and a second light-emitting section 27. The light-receiving section 26 is arranged so as to sandwich a bill and so as to be opposed to the first light-emitting section 23. The second light-emitting section 27 is arranged adjacent to both sides in the bill transfer direction of the light-receiving section 26, and is capable of irradiating slit-like light.

The first light-emitting section 23 that is disposed oppositely to the light-receiving section 26 of the line sensor 25 functions as a transmission light source. As shown in FIG. 2, this first light-emitting section 23 is structured as a so called light guide formed in the shape of a synthetic resin-based rectangular rod. Preferably, this light-emitting section has a function of inputting ejection light from the light emitting element 23*a* such as an LED installed at one end and emitting light while guiding the light along a longitudinal direction. In this manner, with a simplified structure, it becomes possible to uniformly irradiate, with slit-like light, an entire area in the widthwise direction of the bill to be transferred.

The light-receiving section 26 of the line sensor 25 is arranged linearly in parallel to the first light-emitting section 23 that is a light guide. This light-receiving section is formed in the shape of a thin plate which extends in a crossing direction relative to the bill transfer path 5 and is formed in the shape of a belt having a width to an extent such that it does not adversely affect sensitivity of a light-receiving sensor (not shown) provided at the light-receiving section 26. Specifically, at the center in the thickness direction of the light-receiving section 26, a plurality of CCDs (Charge Coupled Devices) are linearly provided, and a SELFOC lens array 26*a* is linearly disposed so as to collect transmission light and reflection light at an upward position of these CCDs.

The second light-emitting section 27 of the line sensor 25 functions as a reflection light source. Like the first light-emitting section 23, this second light-emitting section 27 is structured as a so called light guide formed in the shape of a synthetic resin-based rectangular rod, as shown in FIG. 3. Preferably, this section has a function of inputting ejection light from the light emitting element 27*a* such as an LED installed at an end and emitting light while guiding the light along a longitudinal direction. In this manner, with a simplified structure, it becomes possible to uniformly irradiate, with slit-like light, an entire area in the widthwise direction of the bill to be transferred.

The second light-emitting section 27 is capable of irradiating a bill with light at an elevation angle of 45 degrees. This section is arranged so that the light-receiving section 26 (photosensor) as to receive reflection light from the bill. In this case, while the light irradiated from the second light-emitting section 27 is incident to the light-receiving section 26 at the elevation angle of 45 degrees, the elevation angle is not limitative thereto, and can be appropriately set, as far as reflection light can be reliably received. Thus, the layout of the second light-emitting section 27 and the light-receiving section 26 can be appropriately design-changed according to a structure of a bill identifying device. Further, as to the second light-emitting section 27, the light-receiving sections 27 are installed at both sides while the light-receiving section 26 is sandwiched therebetween so as to irradiate light at an incident angle of 45 degrees from both sides, respectively. In a case where a damage or crease occurs on a surface of a bill, if irregularities having emerged at these damaged or creased sites are irradiated with light one-sidedly, the light is interrupted at such irregularities, so that shading may occur. The shading at the irregularities is prevented by light irradiated from both sides, making it possible to obtain image data with higher precision than that in one-sided irradiation. Of course, the second light-emitting section 27 may be installed one-sidedly.

The abovementioned line sensor 25 is exposed to the bill transfer path 5. Thus, at both ends in the bill transfer direction at a surface portion thereof (a portion which is substantially flush with transfer face 3*a*), irregularities 25*a* are formed as shown in FIG. 2, so that a bill to be transferred is hardly caught. Further, like the line sensor 25, in the light emitting unit 24 as well, at both ends in the bill transfer direction at a surface portion thereof, irregularities 24*a* are formed as shown in FIG. 2, so that a bill to be transferred is hardly caught.

Next, a bill authentication judging method executed in a bill identifying unit for identifying bill authentication, based upon the bill information read by the abovementioned bill reader 20, will be specifically explained. Hereinafter, the authentication judging process utilizing reflection light, as set forth above, will be explained.

Figure 7:
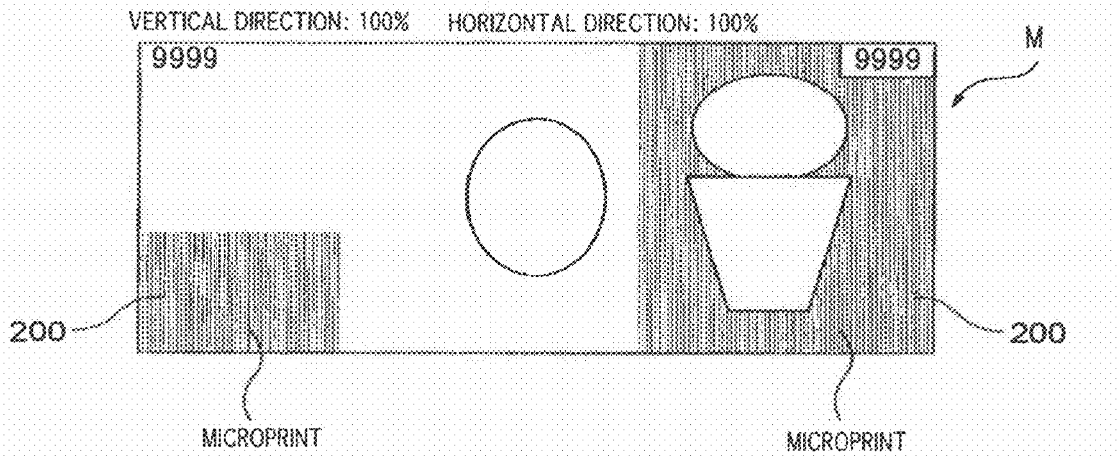
FIG. 7 is a view showing a schematic view of a bill.

In general, as one means for anti-counterfeit, a microprint (such as an extremely fine character or pattern which is hardly reproduced) is formed on a bill. This microprint is constituted by forming a number of thin lines 200 in a unit width, as schematically shown in FIG. 7, and can be formed by means of engraving letterpress printing. Although not described herein in detail, as is evident from the figure, the microprint is constituted by drawing a number of straight thin lines in a unit width. Of course, the straight thin lines may be curved lines or may be a combination of a straight line and a curved line, without being limitative thereto. Further, a character or a pattern may be separately made up of these thin lines.

In the authentication judging technique according to the embodiment, first of all, in a state in which a bill M is transferred by means of a bill transfer mechanism 8, the bill is irradiated with light from the second light-emitting section 27 in the line sensor 25. Further, reflection light thereof is received by the light-receiving section 26; and reading of the bill is executed. This reading is executed on a pixel-by-pixel basis while a predetermined size is defined as one unit during a bill transfer process, and image data of the thus read bill that is made up of a number of (a plurality of) pixels is stored a storage unit such as a RAM. For the thus stored image data that is made up of the plurality of pixels, image processing is applied so that the number of pixels is increased and/or decreased.

As mentioned above, as to the image data of the bill to which image processing was applied so that the number of pixels is increased and/or decreased, it becomes possible to acquire moire data expressed with the bill-specific, streak-like patterns (moire fringes) at the abovementioned microprint portion. By increasing or reducing the number of pixels, the moire data can be obtained which is specific to a rate of the reduction thereof. The thus obtained moire data is compared with moire data of a prestored authentic ticket, thereby making it possible to judging authentication.

Figure 8:
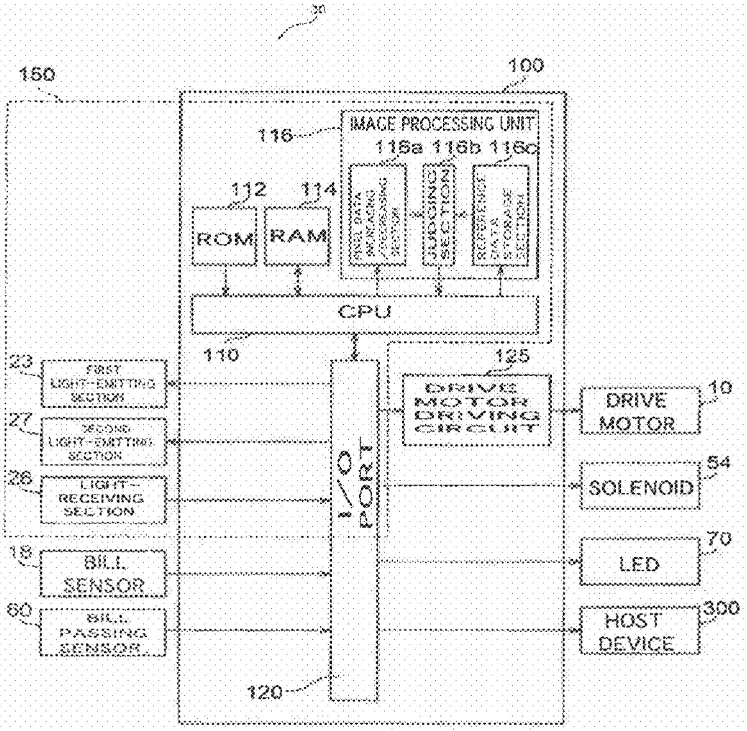
FIG. 8 is a block diagram depicting a control system of the bill identifying device.

FIG. 8 is a block diagram depicting a schematic configuration of a controller which controls a bill identifying device 1 provided with constituent elements such as the bill transfer mechanism 8, the bill reader 20, the shutter mechanism 50, and an authentication judging section 150 which executes a bill authentication judging process.

A controller 30 is provided with a control board 100 which controls an operation of each of the abovementioned drive units. On this control board 100, a CPU (Central Processing Unit) 110 is mounted which controls driving of each of the drive units and constitutes a bill identifying unit, a ROM (Read Only Memory) 112, a RAM (Random Access Memory) 114, and an image processing unit 116.

The ROM 112 stores: programs for actuating a variety of drive units such as the drive motor 10, a solenoid 54, and an LED 70; a variety of programs such as an authentication judging program; and permanent data such as a conversion table made up of data for determining whether or not to expand, magnify, or thin out pixel data at a pixel data increasing/decreasing section 116*a* in the image processing unit 116.

The CPU 110 is actuated in accordance with the programs stored in the ROM 112, inputs/outputs a signal to/from the abovementioned variety of drive units via an I/O port 120, and exercises overall operation control of the bill identifying device. In other words, to the CPU 110, a drive motor driving circuit 125 (drive motor 10), the solenoid 54, and the LED 70 are connected via the I/O port 120, and these drive units are operationally controlled by means of a control signal from the CPU 110, in accordance with an actuation program stored in the ROM 112. Further, to the CPU 110, sense signals are input from a bill sensor 18 or a passing sensor 60 via the I/O port 120. Based upon these sense signals, drive control of the drive motor 10 and blinking control of the LED 70 or that of the solenoid 54 is exercised.

The RAM 114 has a function of temporarily storing data or programs employed to actuate the CPU 110 and a function of acquiring and temporarily storing light-receiving data of a bill targeted for judgment (image data of a bill made up of a plurality of pixels).

The image processing unit 116 is provided with: a pixel data increasing/decreasing section 116*a* for increasing/decreasing the number of pixels pertinent to pixel data of the bill stored in the RAM 114; a reference data storage section 116*b* for storing reference data pertinent to bills; and a judging section 116*c* for judging bills by comparing the image data obtained by increasing/decreasing the number of pixels at the pixel data increasing/decreasing section 116*a* with the reference data stored in the reference data storage section 116*b*. In this case, while, in the embodiment, the reference data is stored in the dedicated reference data storage section 116*b*, it may be stored in the abovementioned ROM 112. In other words, in association with the conversion table for specifying an expansion/reduction rate of image data, the associated authentic ticket data may be stored. Further, while reference data of the authentic ticket may be prestored in the reference data storage section 116*b*, for example, it may be a routine to acquire light-receiving data while the authentic ticket is transferred through the bill transfer mechanism 8, and thereafter, store the acquired data as reference data.

Further, to the CPU 110, a first light-emitting section (light guide) 23 in the light emitting unit 24 and a light-receiving section 26 and a second light-emitting section (light guide) 27 in the line sensor 25 are connected via the I/O port 120. These constituent elements constitute a bill authentication judging section 150 together with the CPU 110, the ROM 112, the RAM 114, and the image processing section 116, and exercise operational control required to judge authentication in the bill identifying device 1. While, in the embodiment, the authentication judging section 150 is commonly used with a control unit which controls a bill drive system, a function of performing an authentication judging process may be employed as its dedicated hardware configuration.

The CPU 110 is connected via the I/O port 120 to a control unit of a gaming medium lending device incorporating the bill identifying device 1 or a host device 300, such as a host computer serving as an external device, so as to transmit a variety of signals (such as information pertinent to bills or alerting signals) to the host device.

Now, one example of procedures for increasing/decreasing pixels of image data in the abovementioned data increasing/decreasing section 116*a* will be described, referring to a conceptual view of FIGS. 9A to 9E.

Figure 9A:
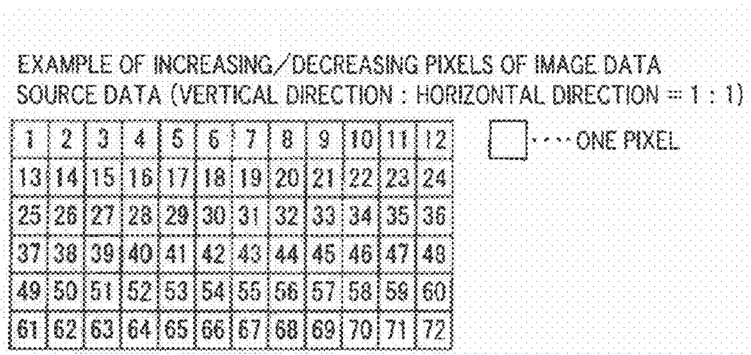
FIGS. 9A to 9E are explanatory views of one example of procedures for increasing/decreasing pixels of image data in a pixel data increasing/decreasing section.

FIG. 9A schematically shows source data obtained by representing, on a pixel-by-pixel basis, image data of a bill first read via the bill reader 20 (wherein vertical direction:horizontal direction is 1:1, and the number of pixels is reduced). One square is equivalent to one pixel, and the numeral assigned in each of the squares indicates brightness of color in the pixel of the read bill. Actually, in each of the pixels, the brightness of each RGB is controlled by means of RGB filter control, thus including color information of brightness which varies depending upon pixels (In FIG. 9A, all of the pixels are made up of brightness which varies depending thereupon).

Figure 9B:
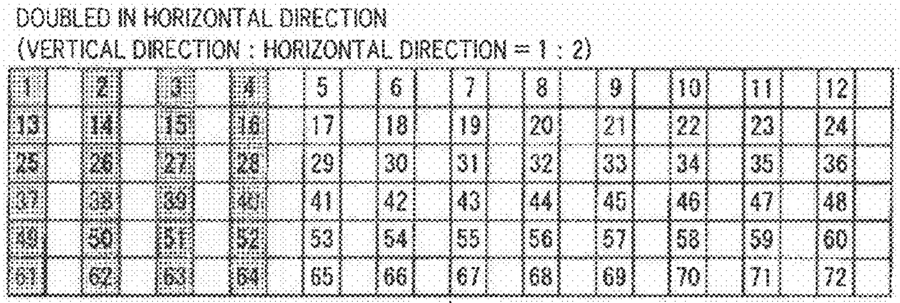
Figure 9C:
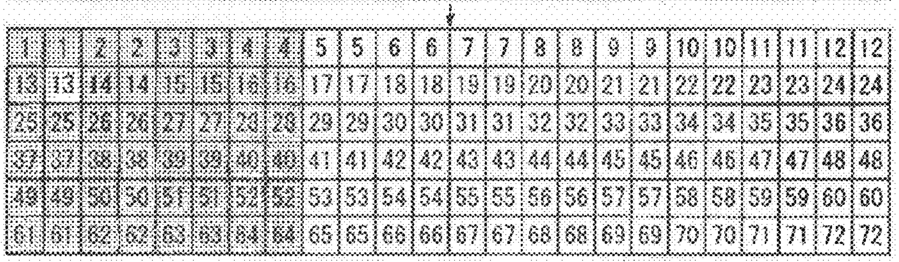

The source data thus read by the bill reader 20 is stored in the RAM 114 that is a storage unit, and thereafter, pixel data is increased and/or decreased in the image data increasing/decreasing section 116*a*. For example, if the number of pixels is increased to be doubled in the horizontal direction while it is left as is in the vertical direction, first of all, one pixel is compensated for in the horizontal direction of each pixel, as shown in FIG. 9B. Next, as shown in FIG. 9C, color information identical to that of a pixel adjacent to the compensated pixel portion is allocated. In this manner, it becomes possible to generate image data magnified in the horizontal direction while it is left as is in the vertical direction. If no magnifying process is performed, for example, it may be predetermined as to what number of pixel data to execute a process of allocating color information in the conversion table.

Figure 9D:
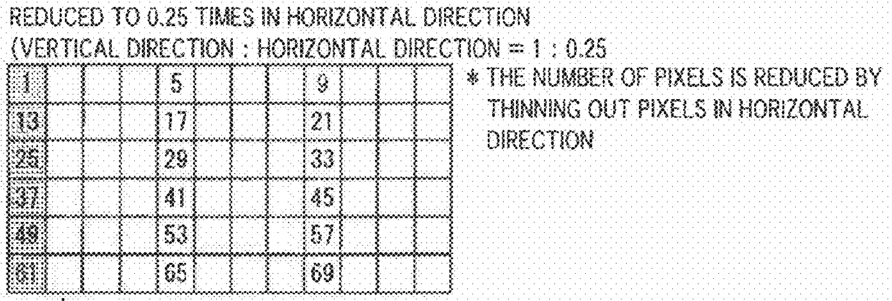
Figure 9E:
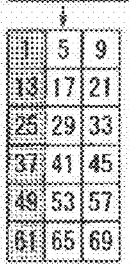

On the other hand, if the number of pixels relative to source data is reduced to 0.25 times in the horizontal direction (vertical direction:horizontal direction=1:0.25) while it is left as is in the vertical direction, for example, a reduction process may be performed by a method of dividing all of the pixels in the horizontal direction by ¼, as shown in FIG. 9D, and thinning out pixels therebetween (pixels indicated by blanks) (FIG. 9E). In this manner, it becomes possible to generate image data reduced to ¼ in the horizontal direction while it is left as is in the vertical direction.

Figure 10A:
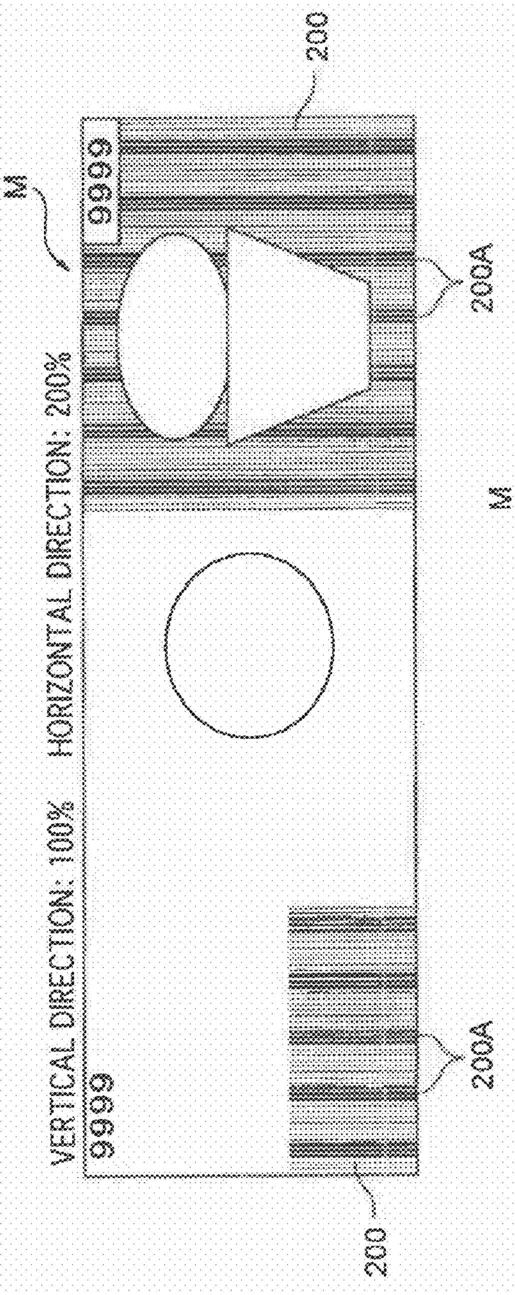
FIGS. 10A and 10B are views showing image data of a bill obtained after a process of increasing/decreasing the number of pixels has been performed, respectively.
Figure 10B:
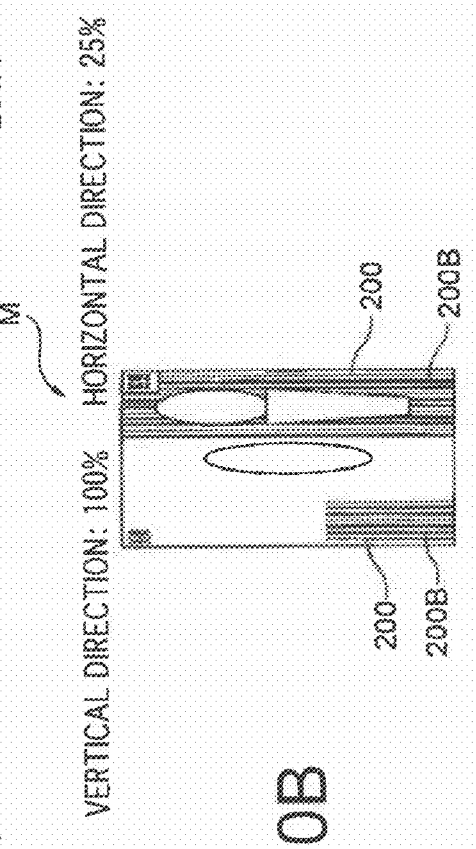

FIGS. 10A and 10B show image data of a bill obtained after the number of pixels has been increased and/or decreased as described above. As shown FIG. 10A, if the number of pixels is increased (so that the vertical direction:the horizontal direction is 1:2), moire data (moire fringes) 200A specific to its increasing rate is obtained at a microprint portion formed on the bill M shown in FIG. 7 (at a portion indicated by a number of thin lines 200). As shown in FIG. 10B, if the number of pixels is decreased (so that the vertical direction: the horizontal direction is 1:0.25), moire data (moire fringes) 200B specific to its decreasing rate is obtained at a microprint portion (a portion indicated by a number of thin lines) formed on the bill M shown in FIG. 7.

Hereinafter, principles of, and conditions for, generating the abovementioned moire fringes, will be described referring to FIGS. 11 to 14.

Figure 11:
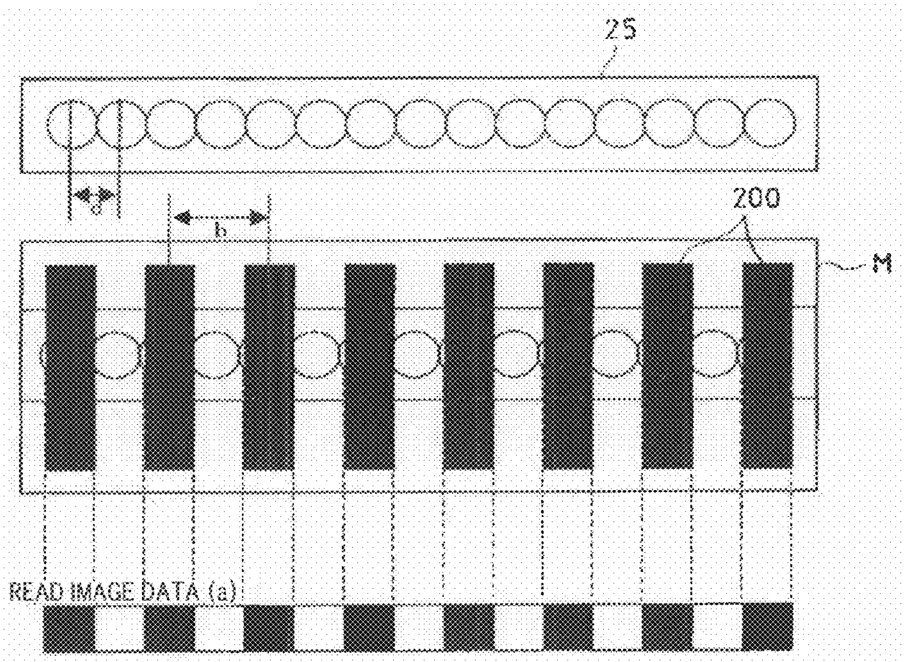
FIG. 11 is a schematic view explaining the principles of generating moire fringes and explaining a condition in which no moire fringes occur.

As shown in FIG. 11, in a case where a gap between the thin lines 200 formed on the bill M (indicated by the adjacent black bar) is defined as "b", if the gap "b" is wider than a gap "d" for reading one pixel by means of the line sensor 25 constituting the bill reader 20 (b>d), the thin lines 200 of the bill can be precisely read. Thus, as to the read image data (a), the thin lines of the bill are reproduced as they are, and no moire fringes occur.

Figure 12:
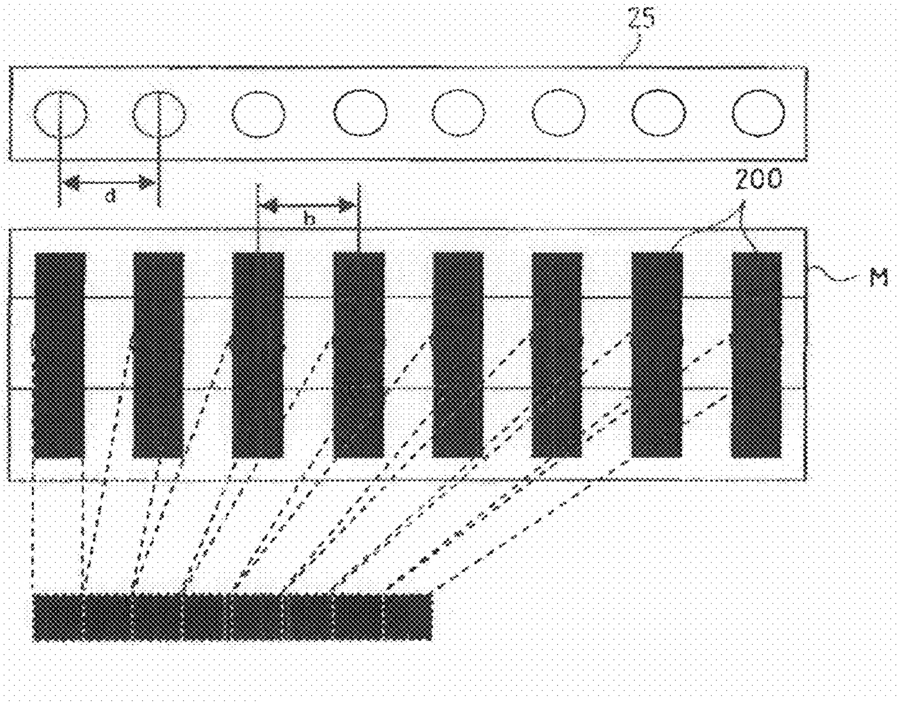
FIG. 12 is a schematic view explaining the principles of generating moire fringes and explaining a condition that such moire fringes occur.

Conversely, as shown in FIG. 12, if the gap "b" between the thin lines 200 formed on the bill M is equal to or smaller than the gap "d" for reading one pixel by means of the line sensor 25, a black bar which is made up of thin lines (b≦d) cannot be reproduced as image data (a) as shown in FIG. 11, and all of the read image data is blackened. In other words, if b≦d, the thin lines 200 of the bill cannot be precisely read and fine lines are coarsened, whereby moire fringes occur.

Figure 13:
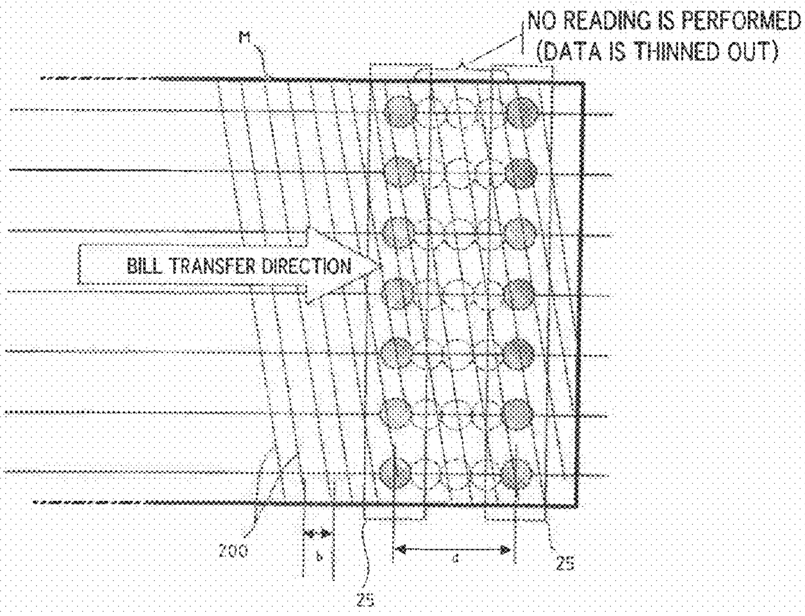
FIG. 13 is a view schematically showing a condition that moire fringes occur when a process of thinning out pixels is performed in a case of reading a bill.

As described above, in a case where the number of pixels is decreased, for example, as shown in FIG. 13, when the gap "b" of the essential thin lines of the bill is equal to or smaller than the gap "d" between the pixels obtained by thinning out pixel data (when the rate of decreasing the number of pixels meets a condition of b≦d), it becomes difficult to clearly identify the thin lines adjacent thereto (the lines of the read thin line data are coarsened), and moire fringes occur due to the coarsened thin lines.

Figure 14:
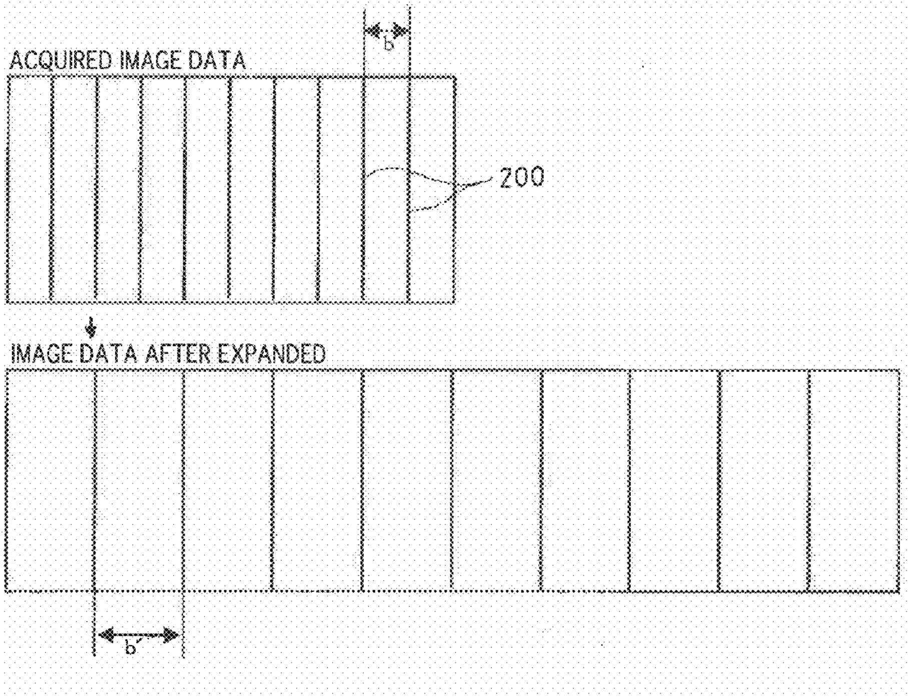
FIG. 14 is a view schematically showing a condition that moire fringes occur when a process of increasing the number of pixels is performed in a case of reading a bill.

On the other hand, as shown in FIG. 14, if the number of pixels is increased in a state in which the gap between the thin lines 200 of the acquired image data is defined as "b", a gap between thin lines obtained by image data after expanded is defined as b' by means of the expansion process. If the gap b' between the thin lines 200 obtained by the image data after expanded is equal to or smaller than the gap "d" for reading one pixel (if the increasing rate meets a condition of $b' \leqq d$), moire fringes occur as in the abovementioned principles.

As set forth above, by increasing/decreasing the number of pixels of image data pertinent to an acquired bill at different ratios, in a bill acquisition direction and a direction orthogonal thereto, it becomes possible to generate moire fringes with image data and to easily acquire moire data.

As a result, in the judging section 116*c*, it becomes possible to judge authentication of a bill in comparison with reference data prestored in the reference data storage section 116*b* (moire fringes data stored according to a magnification of expansion/reduction). Specifically, when pixel data pertinent to brightness (density) is detected as to pixels of a portion at which moire fringes occur, and thereafter, the detected data is compared with the reference data, if a difference therebetween is equal to or smaller than a predetermined value, the difference is regarded as being equal thereto, with respect to the pixel portion. This process is executed as to all of the pixels of the portion at which moire fringes occur, thereby making it possible to judge authentication.

Figure 15:
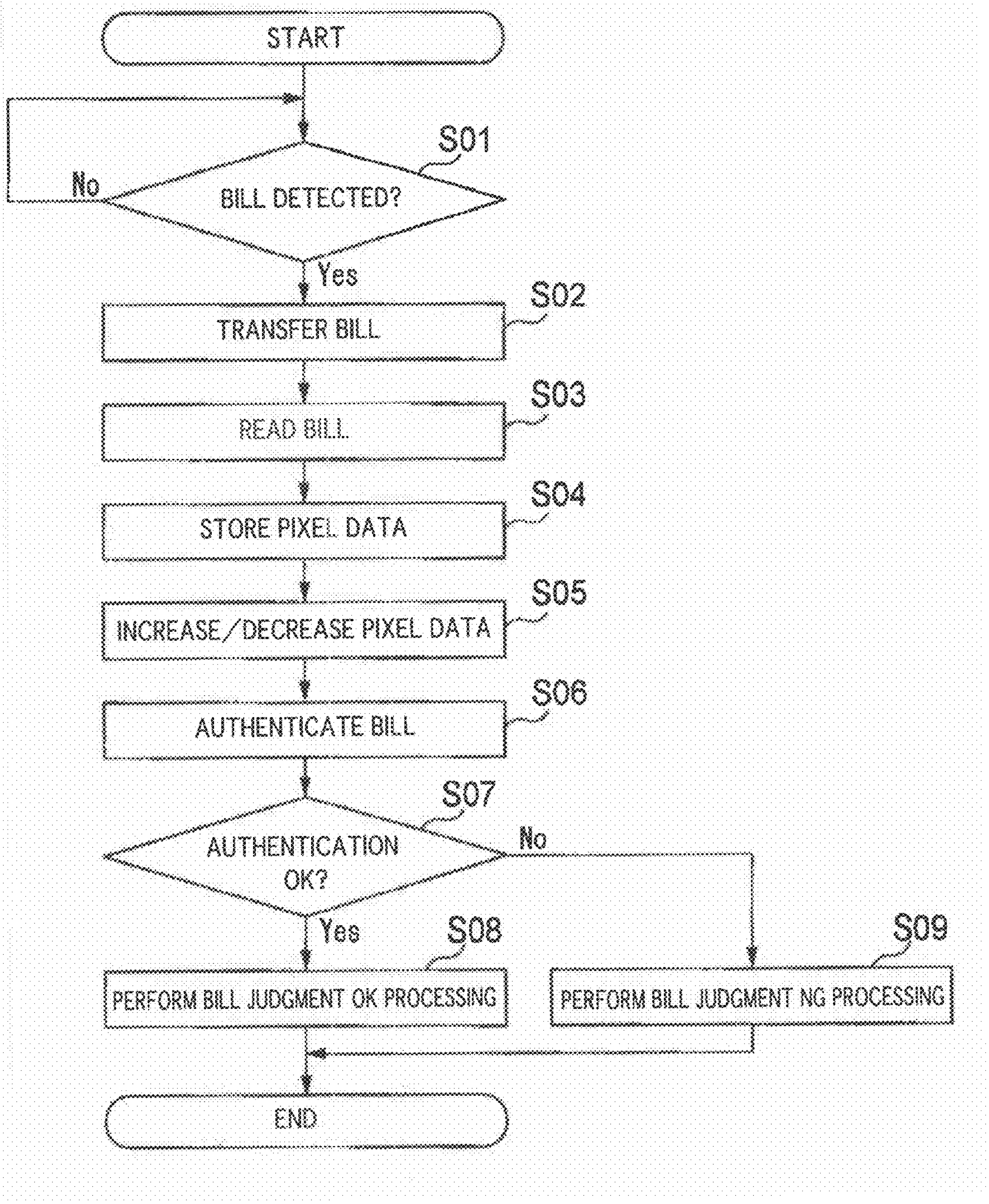
FIG. 15 is a flowchart showing an operation in the bill identifying device and one example of procedures for judging authentication utilizing the abovementioned moire data.

FIG. 15 is a flowchart showing an operational process in the abovementioned bill identifying device and one example of procedures for judging authentication utilizing the abovementioned moire data. Hereinafter, referring to this flowchart, a processing operation of the bill identifying device according to the embodiment will be explained.

First, the CPU 110 of the bill identifying device 1 judges whether or not a bill has been detected (step S01). The judgment is made by means of the bill sensor 18 sensing insertion of the bill and issuing a sense signal. When the bill sensor 18 detects the bill, the drive motor 10 is driven, and the bill is transferred via the bill transfer mechanism 8 (step S02). At this time, the LED 70 is lit, and notifies a user that bill processing is in progress, and additional bill insertion is prevented.

In synchronism with this bill transfer process, the bill reader 20 executes a bill reading process (step S03). This bill reading process is accomplished by the CPU 110 outputting an irradiation signal to the first and second light-emitting sections 23, 27, the light-emitting sections 23, 27 irradiating the bill with irradiation light, and the light-receiving section 26 receiving reflection light thereof. Moire data employed for a bill identifying process is acquired based upon reflection light of the light irradiated from the light-emitting section 27, as described above.

By transferring bills into equipment, the bill reader 20 reads the information, and the abovementioned controller 30 executes an authentication judging process. The abovementioned bill reading is accomplished at the light-receiving section 26 of the line sensor 25 receiving the reflection light derived from the bill being transferred, the light being irradiated from the second light-emitting section 27. While in this reading, as described above, bill image information is acquired on a pixel-by-pixel basis on which a predetermined size is defined as one unit. Further, transmission light, which is irradiated from the first light-emitting section 23 and transmits a bill, can be employed in another authentication judging process (such as authentication judging process using density data or the like).

When this authentication judging process is executed, if the bill sensor 18 senses a rear end of a bill being transferred (when the bill sensor 18 is OFF), the solenoid 54 is powered, whereby the turning piece 52 is turnably driven to close the bill insertion slot 6, and additional bill insertion is prevented.

As described above, for bill information read on a pixel-by-pixel basis, image data of the entire bill is made up of a plurality of pixels, and the image data is stored in the RAM 114 that is a storage unit (step S04). Next, at the image processing unit 116, the image data stored in the RAM 114 is subjected to image processing so that the number of pixels is increased and/or decreased (step S05). The number of pixels is increased and/or decreased, based upon the conversion table stored in the ROM 112. As bill image data obtained by this process, specific moire data is obtained at a microprint portion, according to the increasing/decreasing ratio, as described above.

Continuously, at step S06, a bill authentication judging process is performed. As described above, specific moire data (moire fringes) are obtained according to the increasing/decreasing rate with the conversion table stored in the ROM. At the judging section 116*c*, the specific moire data is compared with the reference data prestored in the reference data storage section 116*b*, thereby judging authentication of the bill.

In a case where it is judged that the transferred bill is authentic in the abovementioned authentication judging process (Yes at step S07), a bill judgment OK process is executed (step S08). This process includes: transferring a bill as is, to a stacker situated at the downstream side; stopping driving of the drive motor 10 at a stage at which a rear end of the bill transferred to the downstream side is sensed by means of a bill passing sensor 60; concurrently turning OFF driving of the solenoid 54 (powering OFF) to retract the turning piece 52 from the bill transfer path 5 and to open the bill insertion slot 6; and turning OFF the LED 70.

On the other hand, in a case where it is judged that the transferred bill is a counterfeit bill in the abovementioned process of step S07 (including a case in which a bill is extremely mutilated), a bill judgment NG process is executed (step S09). This process includes reversing the drive motor 10 in order to return the inserted bill or outputting an alerting signal to a host device 300 or the like.

According to the bill identifying device 1 structured above, the number of pixels of image data pertinent to the acquired bill is increased/decreased, thereby making it possible to acquire moire data expressed with a streak-like pattern (moire fringes) specific to the bill. For example, even if a sensor constituting the bill reader 20 is changed to the one having high resolution in order to enhance precision of identification, it becomes possible to restrain higher cost without need to manufacture additional equipment such as a filter for generating moire fringes.

In the abovementioned structure, an increased/decreased number of pixels at the pixel data increasing/decreasing section 116*a* is set based upon the conversion table stored in the ROM 112 so that such increasing/decreasing is executed at a predetermined increasing/decreasing ratio in the bill acquisition direction and a direction orthogonal thereto. Therefore, it becomes possible to acquire optimal moire data according to a sensor resolution merely by varying parameters (such as vertical direction: 50% and horizontal direction: 50%). Thus, it is sufficient if parameters for expanding/reducing image data are allocated in the memory space of the ROM, and an unnecessary memory space does not need to be allocated, thus making it possible to restrain higher cost.

Figure 16:
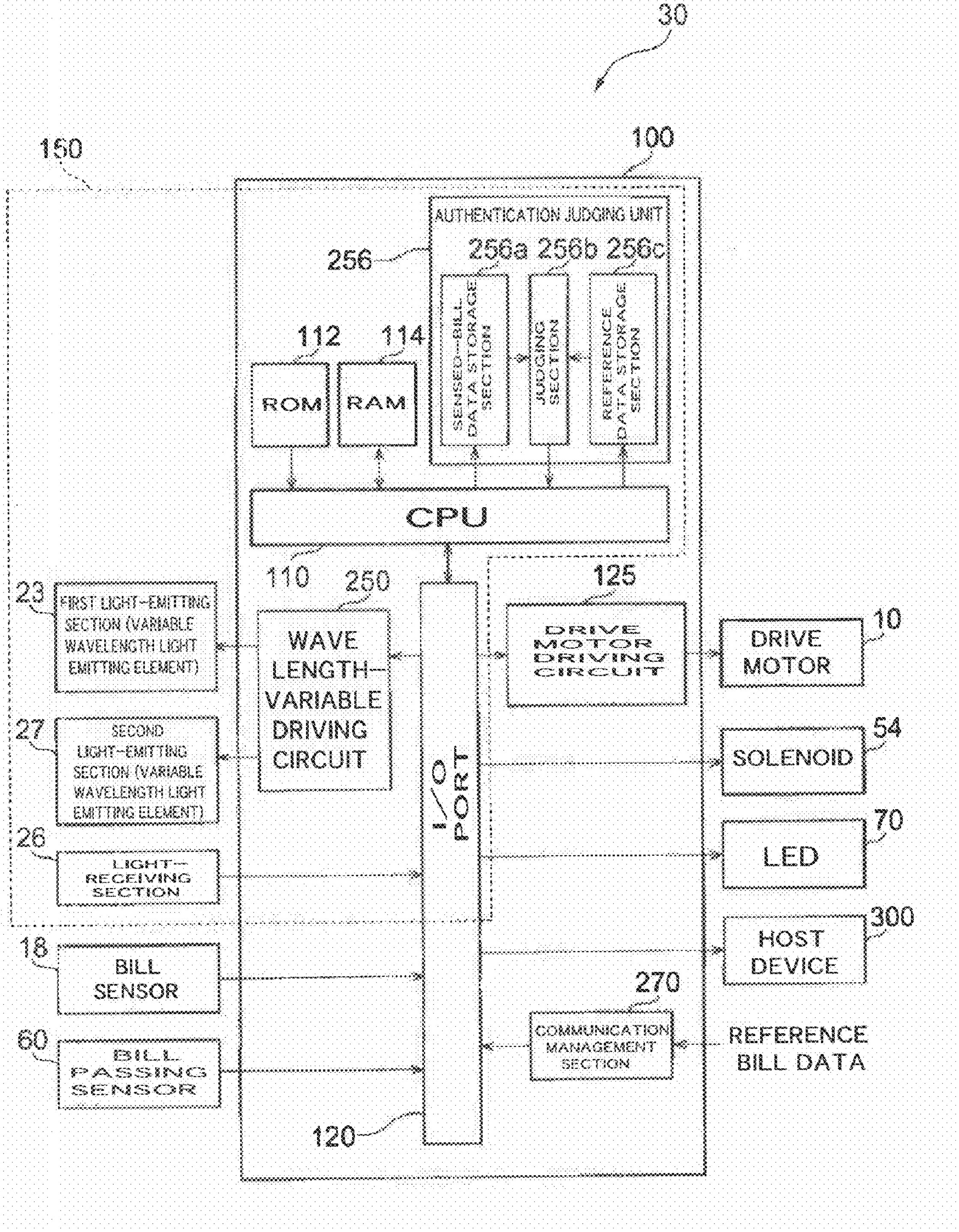
FIG. 16 is a block diagram showing a control system of a bill identifying device according to a second embodiment of the present invention.

Next, a second embodiment of the present invention will be described. The embodiment describes a case in which a bill is subjected to an authentication judging process and describes a case in which a device for handing the bill (sheet identifying device) is employed as a bill identifying device. Since the schematic structure of the bill identifying device is identical to those shown in FIGS. 1 to 6, only constituent elements different therefrom will be described, and an operation thereof will be described referring to a block diagram depicted in FIG. 16.

In the embodiment, the light emitting elements (the first and second light-emitting sections 23 and 27) in the bill identifying device shown in FIGS. 1 to 6 are made up of variable wavelength light emitting units which are capable of irradiating light beams having different wavelengths. As such variable wavelength light emitting units, an LED (Light Emitting Diode), an SLD (Super Luminescent Diode), an SOA (Semiconductor Optical Amplifier), or an LD (Laser Diode) can be employed. Such variable wavelength light emitting element may be installed alone in the bill identifying device or may be installed in plurality. Alternatively, in order to enhance bill identification precision, the above light emitting elements may be linearly disposed to enable irradiation of linear light in a direction orthogonal to the transfer direction relative to a bill.

In addition to the devices of the abovementioned types, a light emitting element, which is capable of surface light emission, such as an organic EL/SED/FED, can be employed. In such surface light emitting element, the non-uniformity in irradiation between the light emitting elements (a difference in luminescence) is more unlikely to occur in comparison with a case in which a variable wavelength light emitting unit is a single aggregate of light emitting elements. This makes it possible to enhance precision of bill identification more remarkably.

In the variable wavelength light emitting elements as described above, for example, a wavelength control signal, specifically speaking, a wavelength control signal of which voltage or current value is varied, is input to the respective one of the first and second light-emitting sections 23 and 27. This is accomplished by means of a wavelength variable drive circuit 250 controlled by the CPU 110. In this manner, desired wavelength light can be irradiated from each of the light-emitting sections 23, 27.

Needless to way, in general, a sensor constituting a light-receiving section as a sensing unit is capable of sensing light having a wide wavelength to a certain extent, and it is desirable that a wavelength is sensible (detectable) in the range in which the variable wavelength light emitting unit is capable of emitting light. A sensor detecting such a variable wavelength may be controlled so that its related element per se can receive variable-wavelength light, or alternatively, detection can be achieved by employing a filter (a lens filter, for example) as an element. Of course, even in a case where a line sensor is employed, it is desirable to constitute the sensor in a manner similar to the above.

On the other hand, an authentication judging unit 256 is provided on a control board 100 constituting a controller 30. This authentication judging unit 256 has a sensed-bill data storage section 256*a*, a reference data storage section 256*c*, and a judging section 256*b* for actually judging authentication of a sheet.

The sensed-bill data storage section 256*a* has a function of, in response to light having any wavelength emitted from the first and second light-emitting sections 23 and 27 that is the abovementioned wavelength light emitting units, detecting at the light-receiving section 26 the transmission light and reflection light obtained from a bill, and storing the detected-bill data.

Further, the reference bill data storage section 256*c* has a function of, in response to a wavelength of bill-irradiating light, storing reference sheet data of the bill, the data being obtained by light having the wavelength. With respect to applicable bills, this reference data storage section 256*c* prestores reference bill data obtained at the time of irradiating light having a wavelength suitable for identification (a wavelength associated for each type of bill and fundamental reference data which is obtained at the time of irradiating light having the wavelength).

This reference data storage section 256*c* prestores reference bill data as to applicable bills. However, in a case where a new type of bill is post-processed, reference bill data can be input (rewritten) via a communication management section 270. The rewriting of the reference bill data can be accomplished by connecting a connector to a connecting unit or via a network (the Internet or a LAN constructed in a predetermined area). In other words, new reference bill data associated with the rewriting process may be input via a network in compliance with a predetermined communication protocol, or alternatively, may be input from an external storage medium or the like via a predetermined input port. The reference data storage section itself may be replaced with the replacement one, as long as it serves as a storage unit such as a ROM. In this manner, reference bill data of the bill stored in the storage unit is rewritten, whereby various types of bills can be easily judged for authentication with the use of one identifying device.

Further, the judging section 256*b* for judging authentication of a sheet has a function of comparing actually sensed bill data stored in the sensed-bill data storage section 256*a* with reference sheet data stored in the reference data storage section 256*c*, in association with a wavelength of irradiated light, and thereafter, judging authentication of the bill.

In the bill identifying device structured above, the first and second light-emitting sections 23 and 27 are capable of irradiating a sheet printing area with light beams having different wavelengths, thus making it possible to judge authentication of different types of bills. In other words, depending upon the type of ink, print ink employed in a sheet printing area has property of absorbing or reflecting specific wavelength light beams (permissible one or more light beams), thus making it possible to select wavelength light optimal for print ink employed for bills to be judged for authentication. Therefore, a dedicated identifying device does not need to be provided for each type of bill, and bills circulating in a plurality of countries can be identified for authentication in all by one identifying device. Further, even if bills of different types are employed, precise identification can be implemented.

In general, as to bills employed in various countries or print inks employed for bills newly issued, it is deemed that a peak of transmission light or reflection light emerges somewhere within the range from the ultraviolet-ray bandwidth to the infrared-ray bandwidth. Thus, if the wavelength of the light irradiated from the first and second light-emitting sections 23 and 27 can be varied in the abovementioned bandwidth, it becomes possible to maintain compatibility with bills of most countries.

At the first and second light-emitting sections 23 and 27 mentioned above, light having a predetermined wavelength may be irradiated at the time of transferring the bill by means of a bill transfer mechanism. Alternatively, the bill targeted to be transferred may be irradiated with light beams having different wavelengths in a state in which it is transferred by means of the bill transfer mechanism. For example, if light beams having different wavelengths are irradiated along a bill transfer area, sheet identification precision can be enhanced more remarkably, for example, in a case where different types of print inks are employed along a reading direction.

With respect to a light irradiation area, part of the bill transferred is irradiated with light in a spot-like manner, whereby data may be read as line information obtained along the bill transfer direction. Alternatively, the area in the entire widthwise direction is irradiated with light in a slit-like manner, whereby data may be read as surface information. Data is thus acquired as surface information, thereby making it possible to acquire two-dimensional image information and to enhance precision of bill identification more remarkably.

While the embodiments of the present invention have been described hereinbefore, the above-described first embodiment may be applied to a structure in which, at the time of reading a bill to be transferred, moire data is acquired by increasing/decreasing the number of pixels of the read image data, and thereafter, authentication of the bill is identified, based upon image data of the bill including the moire data. Further, other structures may be appropriately altered. For example, the structure or layout aspect of a reader (sensor) for reading bills can be variously modified without being limitative to the above-described embodiments.

In the above-described second embodiment, a light emitting element for irradiating a bill with light may be structured so that a wavelength can be variably controlled, and a wavelength control method or the structure of a light emitting element employed is not limitative in particular. Of course, such wavelength-variable light emitting element (including a surface light emitting element or a light emitting element which is capable of irradiating linear light) may be applied to the first and second light-emitting sections 23 and 27 in the first embodiment, or alternatively, the sheet reference data stored in the reference data storage section in the first embodiment may be organized so as to be rewritable.

Apart from a structure in which one light emitting element irradiates light beams having a plurality of wavelengths by exercising voltage control or the like, as described above, a variable wavelength light emitting unit, which is capable of irradiating light beams having different wavelengths, may be structured with the use of a plurality of light emitting elements for irradiating light having a specific wavelength (such as light emitting elements for irradiating ultraviolet ray of light, visible light, and infrared ray of light), for example. In other words, any of the plurality of light emitting elements is caused to selectively emit light or the light quantity of each of the light emitting elements is varied, thereby enabling irradiation of light beams of which wavelengths are varied, on a program of a control circuit.

The range of a ultraviolet-ray zone to an infrared-ray zone may be covered by employing a plurality of light emitting elements which are capable of varying a wavelength in a short wavelength bandwidth. For example, the range of the ultraviolet-ray zone to the visible light zone may be covered by means of one light emitting element and the range of the visible-light zone to the infrared-ray zone may be covered by means of another light emitting element.

In the above-described first and second embodiments, further, a specific bandwidth can be specified and employed within the range of the ultraviolet-ray bandwidth to the infrared-ray bandwidth. Moreover, the wavelengths of actual light emission can be appropriately combined with each other, for example, by installing a plurality of variable wavelength light emitting elements and employing one(s) of them in the infrared-ray zone and the other one(s) in the ultraviolet-ray zone. With this structure, an irradiation wavelength is limited, so that reference sheet data can be precisely associated with the wavelength, enhancing consistency at the time of judgment of authentication.

INDUSTRIAL APPLICABILITY

The sheet identifying device of the present invention is not limitative to a gaming medium lending device, and can be incorporated in a variety of apparatuses which provide commodities or services by inserting bills. While the foregoing embodiments illustrated and described that the sheet identifying device of the present invention serves to process bills, the present invention is also applicable to a device for judging authentication of tickets for money or securities other than bills.

The invention claimed is:

1. A sheet identifying device, comprising:

a reader for reading a sheet in a plurality of pixels, a respective one of which includes color information having a brightness, a predetermined size of which is defined as one unit;

a storage section for storing image data made up of the plurality of pixels read by the reader;

an increasing/decreasing section configured to increase/decrease a number of pixels in the image data;

a sheet identifying section that identifies an authentication of the sheet, based upon the image data having the number of pixels increased/decreased by the increasing/decreasing section; and a variable wavelength light-emitting section which is capable of irradiating a print area of the sheet with light beams having different wavelengths.

* * * * *